Nov. 1, 1949 L. GILCREASE 2,487,020
HELICOPTER
Filed Feb. 12, 1945 5 Sheets-Sheet 1

INVENTOR.
LEONARD GILCREASE
BY Munn, Liddy & Glaccum
ATTORNEYS

Nov. 1, 1949 — L. GILCREASE — 2,487,020
HELICOPTER
Filed Feb. 12, 1945 — 5 Sheets-Sheet 3
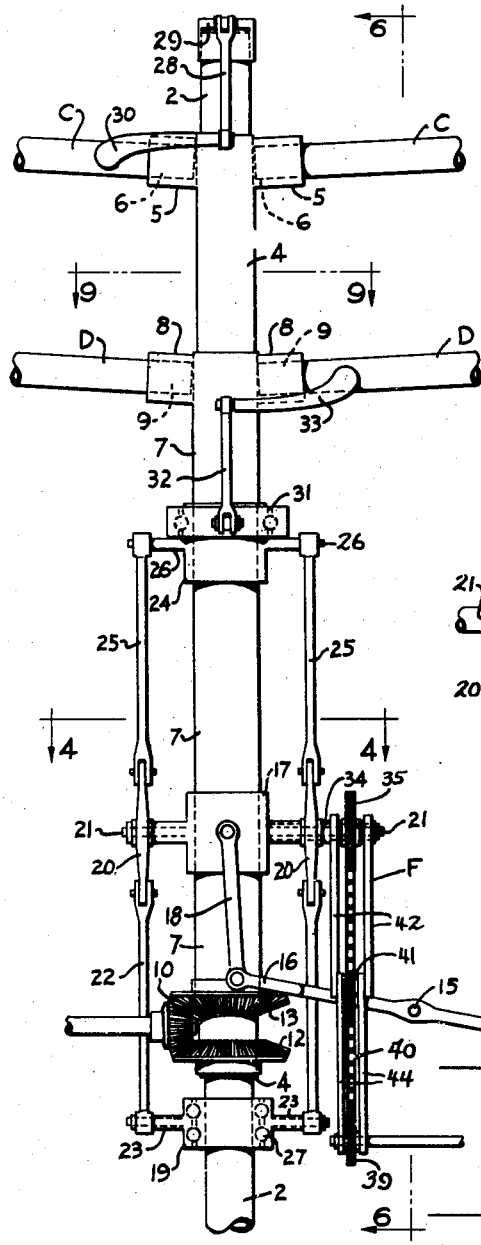
FIG. 3.
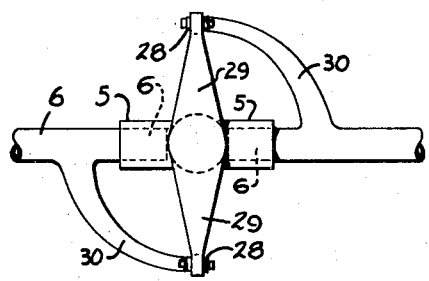
FIG. 5.
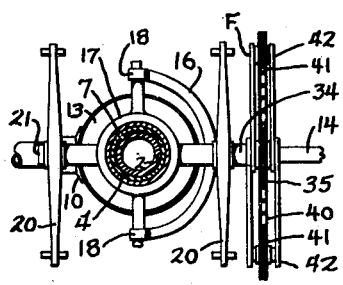
FIG. 4.
INVENTOR.
LEONARD GILCREASE
BY 
ATTORNEYS Nov. 1, 1949 L. GILCREASE 2,487,020
HELICOPTER
Filed Feb. 12, 1945 5 Sheets-Sheet 4
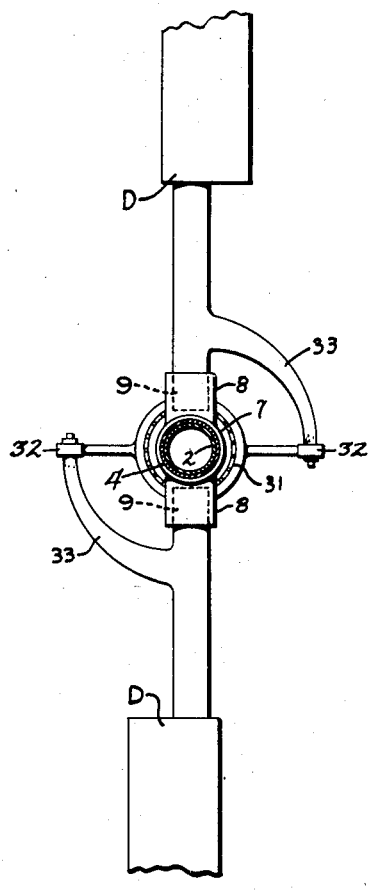
FIG_9_
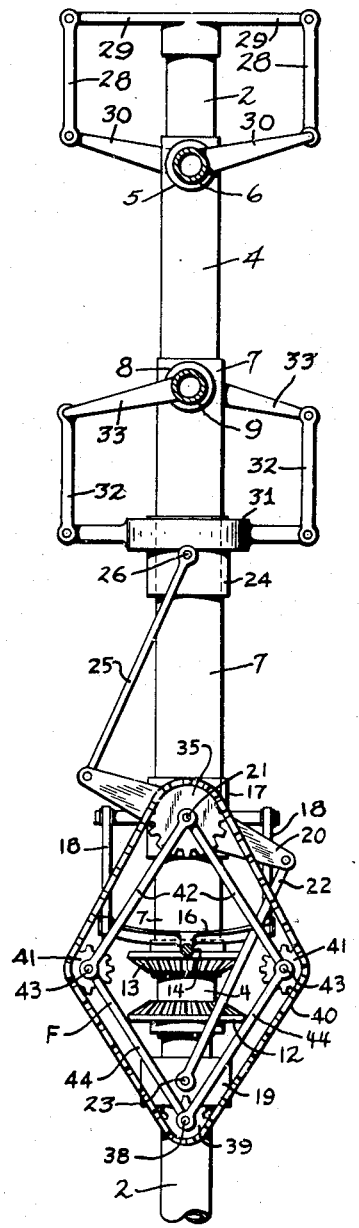
FIG_6_
INVENTOR.
LEONARD GILCREASE
BY
ATTORNEYS Nov. 1, 1949   L. GILCREASE   2,487,020
HELICOPTER Filed Feb. 12, 1945   5 Sheets-Sheet 5

INVENTOR.
LEONARD GILCREASE
BY
ATTORNEYS

Patented Nov. 1, 1949

2,487,020

UNITED STATES PATENT OFFICE 2,487,020

HELICOPTER

Leonard Gilcrease, Armona, Calif.

Application February 12, 1945, Serial No. 577,578

4 Claims. (Cl. 170—135.24)

The present invention relates to improvements in a helicopter, and it consists of the combinations, constructions and arrangements hereinafter described and claimed.

An object of my invention is to provide a helicopter wherein the control for the rotor blades is simplified to two controls; one control being used for altering the pitch of the blades for raising or lowering the helicopter, and the other control being used for altering the pitch of the rotor blades for causing the craft to move to the right or to the left. The second control varies the pitch of the tail rotor for causing the craft to move forwardly or rearwardly as desired or to remain stationary.

A further object of my invention is to provide a helicopter which may be used on land or on water and in which the rotors may have their blade pitches adjusted by the two controls for causing the craft to move vertically, up or down, to hover, to move forwardly or rearwardly, or to turn to the right or to the left. The device is durable and efficient for the purpose intended.

Other objects and advantages will appear in the following specification, and the novel features of the device will be particularly pointed out in the appended claims.

Figure 3 is a side elevation of the flying control shown on an enlarged scale;

Figure 4 is a horizontal section taken along the line 4—4 of Figure 3;

Figure 5 is a top plan view of Figure 3;

Figure 6 is a vertical section taken along the line 6—6 of Figure 3;

Figure 9 is a horizontal section taken along the line 9—9 of Figure 3.

While I have shown only the preferred form of my invention, it should be understood that various changes or modifications may be made within the scope of the appended claims without departing from the spirit and scope of the invention.

Figure 1:
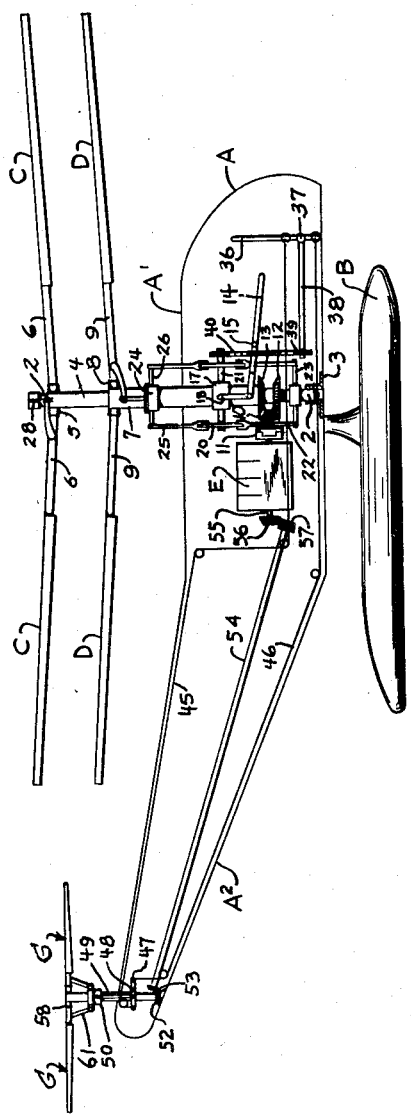
Figure 1 is a side elevation of the operating parts of the helicopter and shows the fuselage diagrammatically.
Figure 2:
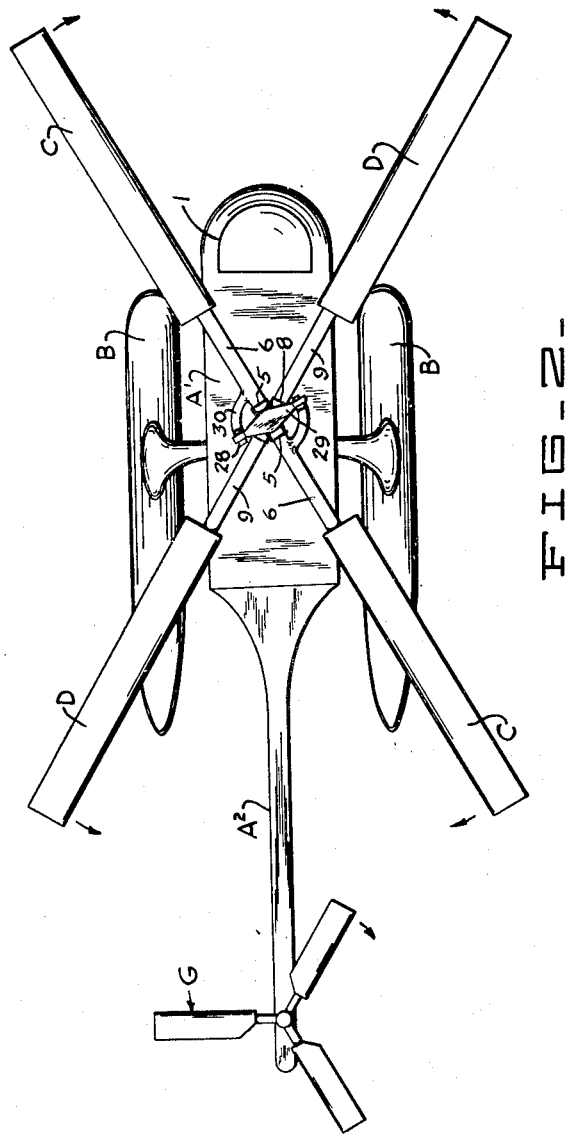
Figure 2 is a top plan view of the helicopter.

In carrying out my invention I provide a fuselage indicated diagrammatically at A in Figure 1. This fuselage has a body portion A1 and a tail portion A2. Figure 2 illustrates the fuselage as having a window 1 therein. The fuselage is supported by pontoons B that are spaced below and to the sides of the body A1, as clearly shown in Figures 1 and 2. These parts of the helicopter are standard and form no part of my invention, except insofar as they cooperate with the parts now to be described.

Within the fuselage I mount a flying control and this is shown in enlarged detail in Figure 3. The flying control comprises an inner pitch control shaft 2 that is rotatably and slidably supported in a bearing 3, the bearing in turn being secured to the floor of the fuselage. The inner shaft 2 extends upwardly to a point well above the top of the fuselage.

A drive shaft 4 is rotatably mounted on the inner shaft 2 and the drive shaft has diametrically opposed bearings 5, see Figures 3 and 5, for rotatably supporting trunnions 6 of two rotor blades, indicated generally at C. A rotation of the drive shaft 4 will rotate the blades C in a clockwise direction when looking at Figure 2. The blades C form the top rotor blades.

A third shaft 7, see Figures 3 and 9, is rotatably mounted on the shaft 4 and has bearings 8 similar to the bearings 5 and the bearings 8 rotatably receive trunnions 9 of two lower rotor blades indicated generally at D. Means will be described hereinafter to show how the lower rotor blades D are rotated in counter-clockwise direction when looking at Figure 2, for the purpose of off-setting any rotational torque that might be imparted to the fuselage by the rotation of the upper rotor blades C.

In Figure 1 I indicate a powerplant generally at E and this powerplant may be of any type desired and is connected to a bevel gear 10 by a clutch 11. The bevel gear 10 in turn meshes with two other bevel gears 12 and 13, see Figure 3. The gear 12 is connected to the inner drive-shaft 4 while the gear 13 is connected to the outer drive shaft 7. The two shafts 4 and 7 are rotated in opposite directions and will cause the upper and lower rotors C and D to rotate in opposite directions.

I will now describe how the pitch of the rotor blades C and D may be controlled simultaneously for raising or lowering the helicopter. One of the two controls mentioned in the objects is a pitch control lever 14, see Figure 3, which is pivoted to the fuselage at 15 and has a forked end 16 that half encircles the shaft 7. A sleeve 17 is slidably mounted on the shaft 7 and is raised or lowered by the movement of the fork 16, the fork being connected to the sleeve by links 18 disposed on opposite sides of the shaft 7. A downward movement of the free end of the pitch control lever 14 will cause the links 18 to raise the sleeve 17.

The sleeve is connected to a lower sleeve 19 by levers 20 pivoted on trunnions 21, carried by the sleeve 17 and by links 22 that are connected to one free end of each lever 20 and to trunnions 23, which project from opposite sides of the sleeve 19. A thrust bearing 27 permits the shaft 2 to rotate within the sleeve 19, and a vertical movement of the latter will impart a similar movement to the shaft 2.

The control sleeve 17 is connected to an upper sleeve 24 by links 25 that extend from trunnions 26 on the sleeve 24. The other ends of the links 25 are connected to the free ends of the levers 20. The sleeve 24 permits the shaft 7 to rotate therein. The construction is such that an upward movement of the main or control sleeve 17 will raise the lower sleeve 19 and the upper sleeve 24 therewith as a unit, and a lowering of the sleeve 17 will lower the two sleeves 19 and 24 simultaneously. The sleeve 19 will not rotate with the inner shaft 2 as already stated. The shaft 2 is moved longitudinally in the bearing 3 and the pivot 15 acts as the supporting connection between the inner shaft and the fuselage.

If the operator should move the control sleeve 17 upwardly, the pitch control shaft 2 would be moved upwardly and through links 28, connected to the top of the shaft 2 by diametrically extending arms 29, see Figure 5, the links 28 will raise arcuate arms 30 that are rigidly connected to the trailing sides of the rotor blades C. A lifting of the arcuate arms 30 by the links 28 will rock the trunnions 6 of the blades C in the bearings 5 so that the trailing edges of the blades will be lifted and this will change the pitch of the blades for causing the helicopter to descend.

The same downwardly movement of the free end of the pitch control lever 14 will lift the main control sleeve 17 and the upper sleeve 24. The latter sleeve is connected by a thrust bearing 31 of the outer drive shaft 7 which rotates the lower rotor blades D. An upward movement of the sleeve 24 will cause links 32, pivoted to the casing of the bearing 31, see Figure 3, to move upwardly, and these links are connected to arcuate arms 33 which are rigidly connected to the trailing sides of the lower helicopter blades D. The blades D will have their trunnions 9 rocked in the bearings 8 for changing the pitch of the blades to cause the blades to lower the helicopter.

It will be seen from this construction that as the pitch control lever 14 is moved downwardly the pitch of the blades C and D will cause the helicopter to descend. A reverse movement of the lever 14, i. e., a lifting of the free end of the lever, will cause the pitch of the blades C and D to be changed so that the blades during their rotation will lift the helicopter vertically. The single pitch control lever therefore controls the vertical movement of the helicopter whether up or down and also controls the hovering of the craft at any desired position above the ground.

I will now describe how the blades of the rotors can be simultaneously swung in opposite directions about their longitudinal axes for causing the helicopter to make right and left-hand turns while in the air. Reference to Figures 3 and 6 shows one of the aligned trunnions 21 supporting a sleeve 34 to which the lever 20 is rigidly secured. This sleeve has a sprocket 35 keyed thereto so that a rocking of the sprocket will swing the lever 20 and move the sleeves 19 and 24 toward or away from each other simultaneously, this movement depending upon the particular direction of swing of the lever.

The second control mentioned in the objects is a "joy stick" or control stick 36 that is pivoted at 37 to a shaft 38. The shaft is supported in bearings, not shown, and carries a sprocket 39 which is keyed thereto. The sprocket 39 remains in a fixed axial position and is operatively connected to the sprocket 35 by a sprocket chain 40. It will be noted from Figure 6 that idler sprockets 41 are mounted on a pantograph indicated generally at F and comprising four pairs of links or arms, two pairs of the links 42 being connected to the trunnion 21 that supports the sleeve 34 and having their free ends connected to sprocket axles 43. The other two pairs of links 44 are connected to the same sprocket axles 43 and to the shaft 38. The arrangement is such that the chain 40 is kept taut and in mesh with the sprockets 35 and 39 at all times regardless of the distance between the two sprockets.

It will be seen that when the lever 14 is moved, the sprocket 35 will be moved by the main sleeve 17 toward or away from the sprocket 39. When the sleeve 17 and the sprocket 35 are moved away from the sprocket 39, the sides of the pantograph will collapse and will still keep the chain 40 taut and operatively connected to the sprockets 35 and 39. The arms of the pantograph will expand when the sleeve 17 and sprocket 35 are moved toward the sprocket 39.

If the operator wishes to turn the helicopter to the right while flying, he moves the control or "joy stick" 36 to the right and the stick will rock the shaft 38 and also rock the sprocket 39 and the sprocket 35, by means of the chain 40, in the same direction. The sprocket 35 will be rocked in a counter-clockwise direction during this movement and the lever 20 will be swung in a counter-clockwise direction when looking at Figure 6 to cause the links 22 and 25 to move the sleeves 19 and 24 toward each other simultaneously.

The sleeve 19 will be moved in an upward direction and it will act on the pitch control shaft 2 to raise the shaft and the links 28 to swing the arms 30 upwardly to rock the rotor blades C for causing these blades to incline downwardly. At the same time the sleeve 24 will be moved downwardly and will act on the bearing 31 to move the links 32 and the arms 33 downwardly and cause the rotor blades D to be inclined in an upward direction. The upper rotor blades C will be swung and remain in a partically horizontal position at the completion of this adjustment while the lower blades D will be inclined upwardly at a greater angle. Since the blades D rotate in a counter-clockwise direction when looking at Figure 2, the helicopter will turn to the right and in this way the pilot will make a right turn.

Figure 7:
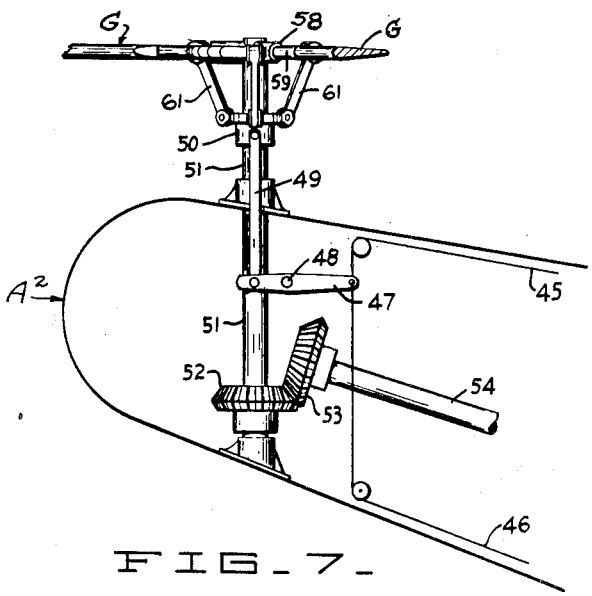
Figure 7 is an enlarged view of the tail rotor.

Before the pilot swings the stick 36 to the right to make the right hand turn he pulls the stick rearwardly and this will cause the stick to pivot about the point 37 and to actuate control cables 45 and 46, see Figure 3, that lead to the tail rotor G. Figure 7 shows the control cables 45 and 46 operatively connected to the same end of a lever 47 which is pivoted to the fuselage at 48. Links 49 are connected to the lever 47 and to a collar 50 that is mounted on a rotor shaft 51. The shaft is rotated by means of bevel gears 52 and 53 and Figure 1 shows the bevel gear 53 mounted on a shaft 54 which is operatively connected to the engine shaft 55 by bevel gears 56 and 57.

Figure 8:
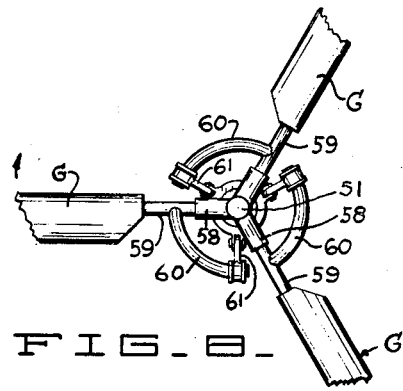
Figure 8 is a top plan view of the tail rotor.

Referring to Figures 7 and 8 it will be noted that the shaft 51 has three radially extending bearings 58 projecting therefrom and spaced equally around the shaft. Rotor blades G have their trunnions 59 rotatably mounted in the bearings 58 and the trunnions are provided with arcuate arms 60. Links 61 contact the arcuate arms 60 with the collar 50 by a thrust bearing, not shown, and in such a manner that the links can rotate with the rotor blades G while permitting the collar 50 to stand still, but to be free to move longitudinally along the shaft 51.

When the joy stick 36 is pulled rearwardly, the cable 46 will swing the lever 47 in a clockwise direction about the pivot 48 when looking at Figure 7, and will raise the links 49 and the collar 50. This upward movement of the collar 50 will lift the thrust bearing and links 61 to rock the arms 60 and trunnions 59 in a direction to incline the blades G downwardly. A rotation of the tail rotor G in a clockwise direction when looking at Figures 2 and 8 will depress or lower the tail A2 of the fuselage. As soon as the tail of the fuselage is depressed sufficiently then the pilot will swing the joy stick 36 to the right which will impart rotation to the sprockets 35 and 39 in the manner already described for feathering the blades on the upper rotor C and for inclining the blades to a still greater degree on the lower rotor D. This results in the craft making a banked right angle turn.

When the turn has been completed, the joy stick is brought back to a vertical position and the machine will proceed along its usual course. The combined lifts of the two rotors C and D will remain approximately the same for all practical purposes when either making a right or a left hand turn. With this type of control, the helicopter has positive stability under any and all conditions of plane or weather. If the power source should fail, the helicopter can glide earthward. Full control of the craft is accomplished by the lever 14 and the control stick 36. The craft can hover at any spot desired under any common wind condition.

When traveling windage, the pilot maintains the control stick 36 at the required angle to the right or to the left of the pivot point 37 to compensate for the flow of air. At all times the control is fully relaxed so that it is an easy matter to operate the lever 14 or the control stick 36.

The weight of the helicopter is no more than the generally accepted type. The blades of each wing or rotor will never have much stress placed upon them and therefore can be made of a lighter construction and shorter in length. No bending moment will be placed on the vertical control shafts and there will always be a balanced lift on both blades of each shaft. The rotating blades of the rear rotor G will maintain the tail of the fuselage in a horizontal position or will raise the tail higher than the main body or depress it lower than the main body, this depending upon the degree and direction of pitch. When the tail is raised by the rear rotor the rotors C and D will cause the craft to move forwardly, and the reverse is true when the rear rotor blades G depress the tail.

The stresses in the helicopter fuselage are slight compared with the accepted design of other helicopters. There are but light horizontal stresses in any direction. The only active stresses are vertical ones due to the small banking of the wings. This permits the horizontal thickness of the fuselage tail to be very thin and this will reduce the drag from this source to a minimum.

It will be noted that the drive and the mechanism for banking the wings consist of shafts and gears and this makes the device positive in operaton. The directional control is entirely in the stick 36. The operator need not use his feet for any guiding purposes because the stick 36 and the lever 14 are the only two controls. This adds greatly to the comfort of the pilot. The helicopter is inherently safe even with the power shut off. The wings are timed to cross each other's path directly in line with the fuselage and at right angles thereto. When the wings are aligned with the fuselage, the width of the craft is narrow and it may be placed in a long, narrow garage.

The pontoons make the device amphibious. Both of the rotors C and D and the tail rotor G rotate at a constant speed which may be governed by the speed of the motor. The helicopter wings are variable pitch and the blades of both wings will have the same pitch except when the craft is making a right or a left hand turn. The pitch of both wings is varied together and equally by the lift control lever 14.

The stick control 36, however, can change the pitch of the wings beyond that of the lift control. For example, if the lift pitch is zero, the stick 36 can change one wing pitch into a positive increase and at the same time change the other wing pitch an equal amount in the opposite direction. The total of the combined pitches will remain zero. By this means the stick 36 controls the turning of the ship and the craft will always turn in the direction of the wing with the least pitch.

The rear rotor G operates only in a plane parallel to the planes of the main rotor C and D. By changing the pitch of the rear rotor from positive to negative, the plane will change its course from moving forwardly to that of moving rearwardly. Actually the small wing G governs the tilt of the helicopter and the forward or rearward movement of the craft results from the angle of tilt of the large rotors C and D. By tilting the craft with the rear rotor G and then moving the stick 36 to the right, a right angle directional turn can be made almost instantly.

Both rotor controls are symmetrical. The wing pitch controls; i. e., the inner shaft 2 and the thrust bearing 31 rotate with the rotors. The teeter levers 20 are balanced so that they are easy to operate. The position of the sleeve 17 determines the general pitch of both rotor wings. The degree of pitch determines the rate of ascension or descension of the plane. The forward and backward movement of the joy stick 36 controls the pitch of the blades on the rear rotor G without affecting the pitches of the blades on the rotor C and D. The blades on the rear rotor G can be rocked from a strong positive pitch, through zero to about an equal negative pitch. This determines the forward and backward movement of the craft. All rotors may be governor controlled if desired so as to rotate at constant speed. The entire operation of the plane is by wing pitch control.

When the joy stick 36 is swung laterally, the pitch of the blades on the rotor C are varied inversely to the pitch of the blades on the rotor D. As the pitch of the blades on one rotor increases, the pitch of the blades on the other rotor decreases. The rotation of the rotor blade C and D are synchronized so that the wings will cross each other while in line with the fuselage. This facilitates hangar storage when the blades are at rest. In travelling forward, the blades of the rotors C and D would take on a pitch that would propel the craft forwardly through the air like an airplane propeller except the angle of the propeller axis would be different. A leisurely change of direction can be accomplished while the craft is in flight and this is accomplished by the stick 36. If a square turn is desired, the stick 36 can be pulled rearwardly which will temporarily tend to tilt the ship in a reverse position. The ship is now banked and is ready to make a right or left hand turn, depending upon which way the stick is swung laterally. A movement of the stick rearwardly like cutting across the diameter of a circle, followed by a movement of the stick along the perimeter of the circle back to its starting point, will cause the craft to execute a banked right angle turn and the craft will then proceed in its new direction.

I claim:

1. In a helicopter, a pair of telescoped rotor hollow shafts, means for rotating the shafts in opposite directions, radially extending blades carried by each shaft and being tiltable about their longitudinal axes, the blades of the outer rotor shaft being disposed at a lower elevation than the blades of the inner rotor shaft, a longitudinally movable pitch control shaft slidably mounted within the inner rotor shaft and operatively connected to the top blades for varying their pitch when the pitch shaft is moved longitudinally, a collar slidable on the outer rotor shaft and operatively connected to the lower blades for varying their pitch when the collar is moved longitudinally, and a control means including a control lever for simultaneously moving the pitch shaft and collar in the same direction when the lever is moved for causing the blades to be tilted to lift the helicopter, said blades being simultaneously tilted to cause the helicopter to descend when the lever is moved in the opposite direction, a control stick swingable laterally to the right or to the left, means connecting the stick with the pitch shaft and collar for moving the two towards each other when the stick is swung laterally in one direction whereby the top and bottom blades will be tilted to cause the helicopter to turn in one direction, said control stick when swung laterally in the opposite direction causing the pitch shaft and collar to move away from each other whereby the blades will be tilted to cause the helicopter to turn in the opposite direction.

2. In a helicopter, a pair of hollow rotor shafts telescoped together, means for rotating the shafts in opposite directions, radially extending blades carried by each shaft and being tiltable about their longitudinal axes, the blades of the outer rotor shaft being disposed at a lower elevation than the blades of the inner rotor shaft, a longitudinally movable pitch control shaft slidably mounted within the inner rotor shaft and operatively connected to the top blades for varying their pitch when the pitch shaft is moved longitudinally, a sleeve slidable on the outer rotor shaft and operatively connected to the lower blades for varying their pitch when the sleeve is moved longitudinally, a control collar, levers carried by the collar, links connecting the free ends of the levers with the sleeve and pitch shaft, and means for rocking the levers in either one of two directions for simultaneously moving the sleeve and pitch shaft toward or away from each other, whereby the blades are tilted so that they will have the same lifting effect; i. e., one set of blades will be tilted toward zero lift while the others are swung into a greater lifting angle when the levers are swung in one direction, and vice versa when the levers are swung in the opposite direction.

3. In a helicopter, a pair of vertically-disposed hollow rotor shafts, one being rotatable inside of the other, means for rotating the shafts in opposite directions, radially extending blades carried by each shaft and being tiltable about their longitudinal axes, the blades of the inner rotor shaft being disposed at a higher elevation than the blades of the outer rotor shaft, a longitudinally movable pitch control shaft slidably mounted within the inner rotor shaft and operatively connected to the top blades for varying their pitch when the pitch shaft is moved longitudinally, a sleeve slidable on the outer rotor shaft and operatively connected to the lower blades for varying their pitch when the sleeve is moved longitudinally, a control collar, connections between the collar and sleeve and between the collar and pitch shaft for moving them vertically as a unit when the control collar is moved vertically, a control lever operatively connected to the control collar for moving the latter, said connections including a trunnion on the control collar, a lever rotatable on the trunnion, links connecting the lever ends with the sleeve and pitch shaft, a sprocket for rocking the last-named lever and movable with the control collar, a horizontal control shaft, a second sprocket mounted on the horizontal control shaft, a sprocket chain operatively connecting the two sprockets together, means for taking up slack of the sprocket chain as the first sprocket is moved with respect to the second sprocket, and a control stick connected to the horizontal control shaft for rocking the latter when the stick is swung to the right or left.

4. In a helicopter, a pair of vertically-disposed hollow rotor shafts, one being rotatable inside of the other, means for rotating the shafts in opposite directions, radially extending blades carried by each shaft and being tiltable about their longitudinal axes to vary their pitch, the blades of the inner rotor shaft being disposed at a higher elevation than the blades of the outer rotor shaft, a longitudinally movable pitch control shaft slidably mounted within the inner rotor shaft and operatively connected to the top blades for varying their pitch when the pitch shaft is moved longitudinally, a sleeve slidable on the outer rotor shaft and operatively connected to the lower blades for varying their pitch when the sleeve is moved longitudinally, a control collar, connections between the collar and sleeve and between the collar and pitch shaft for moving them vertically as a unit when the control collar is moved vertically, a control lever operatively connected to the control collar for moving the latter, said connections including a trunnion on the control collar, a lever rotatable on the trunnion, links connecting the lever ends with the sleeve and pitch shaft, a sprocket for rocking the last-named lever and movable with the control collar, a horizontal control shaft, a second sprocket mounted on the horizontal control shaft, a sprocket chain operatively connecting the two sprockets together, means for taking up slack of the sprocket chain as the first sprocket is moved with respect to the second sprocket, and a control stick connected to the horizontal control shaft for rocking the latter when the stick is swung to the right or left, a rear rotor shaft for the helicopter operatively connected to said shaft rotating means so as to be rotated by said means, blades extending radially from the rear shaft and being tiltable about their longitudinal axes to vary the pitch of the rear rotor, and means operatively connecting the rear rotor blades with the control stick so that a forward and back swinging movement of the stick will alter the blade pitch of the rear rotor to raise or depress the rear of the helicopter for causing the helicopter to go forward or rearward, respectively, the stick when moved laterally during its back swinging movement, causing the fuselage to be banked when making a right or left turn.

LEONARD GILCREASE.

REFERENCES CITED

The following references are of record in the file of this patent:

UNITED STATES PATENTS

| Number | Name | Date |
|---|---|---|
| 922,756 | Degn | May 25, 1909 |
| 1,084,806 | Lister | Jan. 20, 1914 |
| 1,113,623 | Hawes | Oct. 13, 1914 |
| 1,783,458 | Windsor | Dec. 2, 1930 |
| 1,878,955 | Mantell | Sept. 20, 1932 |
| 1,940,108 | Sweet | Dec. 19, 1933 |
| 1,960,141 | D'Ascanio | May 22, 1934 |
| 1,994,488 | Sikorsky | Mar. 19, 1935 |
| 2,256,635 | Young | Sept. 23, 1941 |
| 2,256,918 | Young | Sept. 23, 1941 |
| 2,271,473 | Bennett | Jan. 27, 1942 |
| 2,378,381 | Brown | June 19, 1945 |
| 2,396,590 | McDougal | Mar. 12, 1946 |